United States Patent
Gilliland

(10) Patent No.: US 8,340,163 B2
(45) Date of Patent: Dec. 25, 2012

(54) IMPLEMENTING SINGLE LINE ASYNCHRONOUS DUAL WATCHDOG COMMUNICATION FOR ESD IMMUNITY

(75) Inventor: Don A. Gilliland, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 12/465,689

(22) Filed: May 14, 2009

(65) Prior Publication Data
US 2010/0290508 A1 Nov. 18, 2010

(51) Int. Cl.
*H04B 1/38* (2006.01)
(52) U.S. Cl. ......................................... 375/220
(58) Field of Classification Search .................. 375/220, 375/295, 316, 346
See application file for complete search history.

(56) References Cited

U.S. PATENT DOCUMENTS

| | | | | |
|---|---|---|---|---|
| 4,586,179 A | * | 4/1986 | Sirazi et al. | 714/22 |
| 8,046,596 B2 | * | 10/2011 | Ciaffi et al. | 713/300 |
| 2003/0158700 A1 | * | 8/2003 | Forler et al. | 702/178 |
| 2008/0030245 A1 | * | 2/2008 | Elrod et al. | 327/143 |

* cited by examiner

*Primary Examiner* — Khanh C Tran
(74) *Attorney, Agent, or Firm* — Joan Pennington

(57) ABSTRACT

A method and dual watchdog communication circuit for implementing single line asynchronous dual watchdog communication for electrostatic discharge (ESD) immunity, and a design structure on which the subject circuit resides are provided. The dual watchdog communication circuit includes a source transceiver module and a sink transceiver module connected together by a single line, each of the source transceiver module and the sink transceiver module uses a coded pulse for the single line asynchronous dual watchdog communication.

15 Claims, 4 Drawing Sheets

US 8,340,163 B2

IMPLEMENTING SINGLE LINE ASYNCHRONOUS DUAL WATCHDOG COMMUNICATION FOR ESD IMMUNITY

FIELD OF THE INVENTION

The present invention relates generally to the data processing field, and more particularly, relates to a method and circuit for implementing single line asynchronous dual watchdog communication for electrostatic discharge (ESD) immunity, and a design structure on which the subject circuit resides.

DESCRIPTION OF THE RELATED ART

A problem exists to protect circuitry that is susceptible to ESD impulses that may occur on a non-maskable asynchronous single line, which is not ignored by firmware within a receiving circuit connected to the single line.

Such non-maskable asynchronous lines with ESD impulse noise susceptibility include, for example, reset, power-on reset (POR), interrupt lines, and the like.

The problem of ESD impulses occurs, for example, with reset lines on peripheral products attached to servers. ESD impulses can affect circuitry within servers that are exposed to high levels of noise.

A need exists for an effective mechanism to provide ESD immunity for a circuit attached to a non-maskable asynchronous single line.

SUMMARY OF THE INVENTION

Principal aspects of the present invention are to provide a method and dual watchdog communication circuit for implementing single line asynchronous dual watchdog communication for electrostatic discharge (ESD) immunity, and a design structure on which the subject circuit resides. Other important aspects of the present invention are to provide such method, circuit and design structure substantially without negative effect and that overcome many of the disadvantages of prior art arrangements.

In brief, a method and dual watchdog communication circuit for implementing single line asynchronous dual watchdog communication for electrostatic discharge (ESD) noise immunity, and a design structure on which the subject circuit resides are provided. The dual watchdog communication circuit includes a source transceiver module and a sink transceiver module connected by a single line. The single line carries communications between the source transceiver module and the sink transceiver module. Each of the source transceiver module and the sink transceiver module uses a coded pulse to implement the single line asynchronous dual watchdog communication to provide ESD noise immunity.

In accordance with features of the invention, when the source transceiver module receives a valid level output from the sink transceiver module, the source transceiver module outputs a sink coded pulse to the sink transceiver module, and starts a source timer. Upon receiving the valid sink coded pulse, the sink transceiver module starts a sink timer and outputs a source coded pulse to the source transceiver module. When the source transceiver module receives the valid source coded pulse, then the source transceiver module sends nothing further. Then the sink timer times out and generates the valid level output. Otherwise when forward noise or reverse noise is present that is large enough to interrupt the transfer either way the source transceiver module does not see the valid source coded pulse and repeats outputting the sink coded pulse to the sink transceiver module, and starting the source timer, and continues until a valid source coded pulse is received.

In accordance with features of the invention, the source transceiver module includes a transmitter and a first receiver coupled to the single line. The source transceiver module includes a control block coupled to the transmitter, a timer, and a second receiver receiving an input to the source transceiver module. The source timer also is coupled to the first receiver.

In accordance with features of the invention, the sink transceiver module includes a transmitter and a receiver coupled to the single line. The sink transceiver module includes a control block coupled to the receiver, a timer, and a second transmitter providing an output from the sink transceiver module. The sink timer also is coupled to the first transmitter.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method and a dual watchdog communication circuit for implementing single line asynchronous dual watchdog communication for electrostatic discharge (ESD) immunity, and a design structure on which the subject circuit resides are provided. The dual watchdog communication circuit includes a source transceiver module and a sink transceiver module, each using a coded pulse that avoids errors that otherwise could result from electrostatic discharge (ESD) noise on a single line connecting the source transceiver module and the sink transceiver module.

Figure 1:
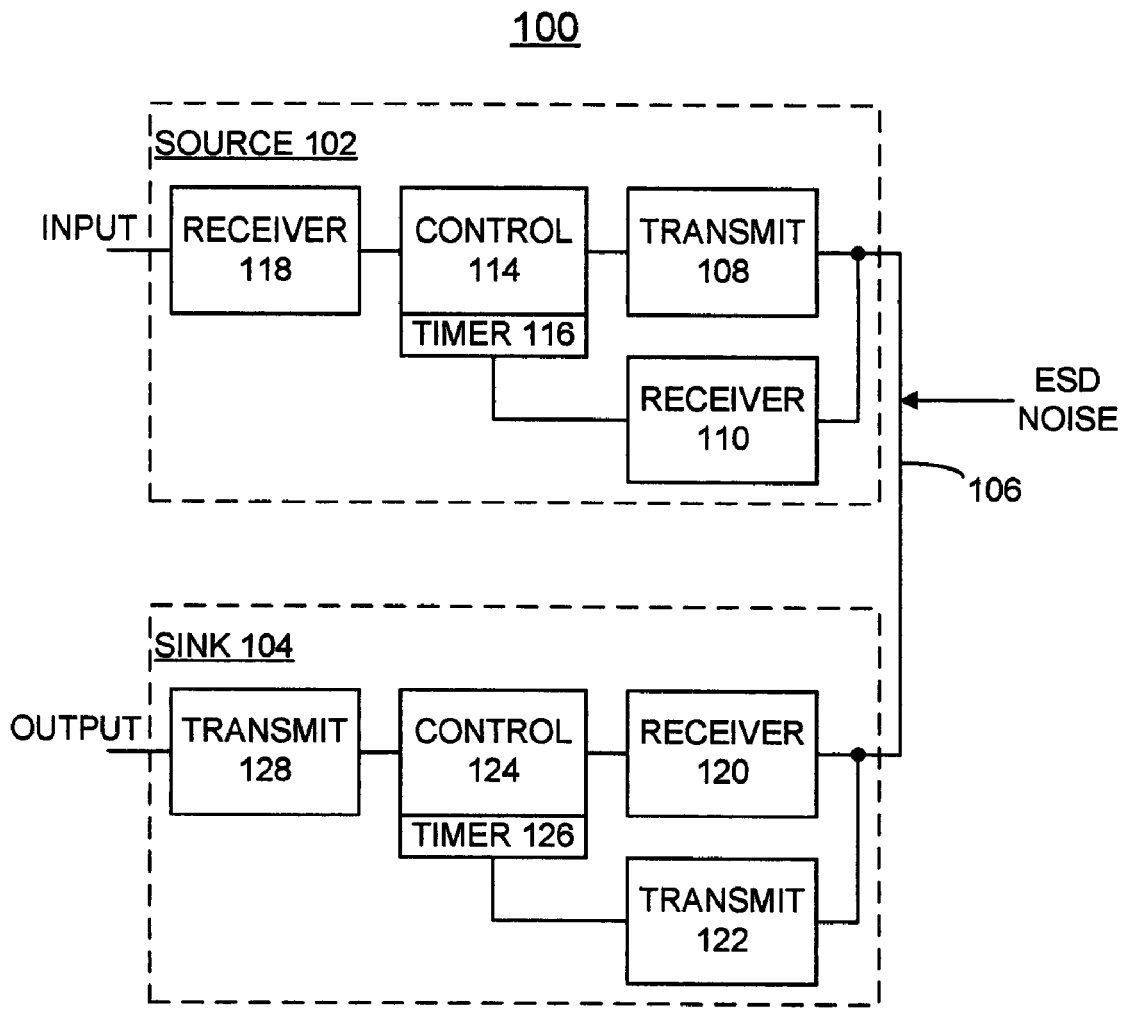
FIG. 1 is a schematic diagram of a dual watchdog communication circuit for implementing single line asynchronous dual watchdog communication for electrostatic discharge (ESD) immunity in accordance with the preferred embodiment.

Having reference now to the drawings, in FIG. 1, there is shown a dual watchdog communication circuit for implementing single line asynchronous dual watchdog communication for electrostatic discharge (ESD) immunity generally designated by the reference character 100 in accordance with the preferred embodiment. Dual watchdog communication circuit 100 includes a source or a source transceiver module 102 and a sink or sink transceiver module 104. The source transceiver module 102 and the sink transceiver module 104 communicate with a single line 106 that connects the source transceiver module 102 and the sink transceiver module 104 together and that is susceptible to ESD impulse noise.

The single line 106 is connected to a transceiver or a transmitter 108 and receiver 110 at the source transceiver module 102 and is connected to a transceiver or, a receiver 120 and a transmitter 122 at the sink transceiver module 104.

The source transceiver module 102 includes a control block 114 controlling operation of the source transceiver module 102 and coupled to the transmitter 108, a source timer 116, and a second receiver 118 receiving an input to the source transceiver module. The source timer 116 also is coupled to the first receiver 110.

The sink transceiver module 104 includes a control block 124 controlling operation of the sink transceiver module 104 and coupled to the receiver 120, a sink timer 126, and a second transmitter 128 providing an output from the sink transceiver module. The sink timer 126 also is coupled to the transmitter 122.

In operation of the dual watchdog communication circuit 100, when a noise free input signal is long enough to the source transceiver module 102, the source transceiver module 102 starts its internal countdown timer 116 and sends out a code or output sink coded pulse that is recognized by the sink transceiver module 104. Upon receiving the code the sink transceiver module 104 also starts its own countdown timer 126 and sends back a code or source coded pulse that is recognized by the source transceiver module 102. If the source transceiver module 102 sees a valid code, nothing further is sent out by the source transceiver module 102 and the sink timer 126 times out and the sink transceiver module 104 generates an output low level. However, if forward noise or reverse noise is present that is large enough to interrupt the transfer either way, the source transceiver module 102 does not see a valid return code and keeps repeating its output until a valid code is returned.

In accordance with features of the invention, an advantage is that the single line can be used at the source and sink of a long asynchronous line that can ride though an ESD burst and still present at the sink. Because the sink timer 126 is launched when a valid input code is received, only one output will be presented.

Figure 2:
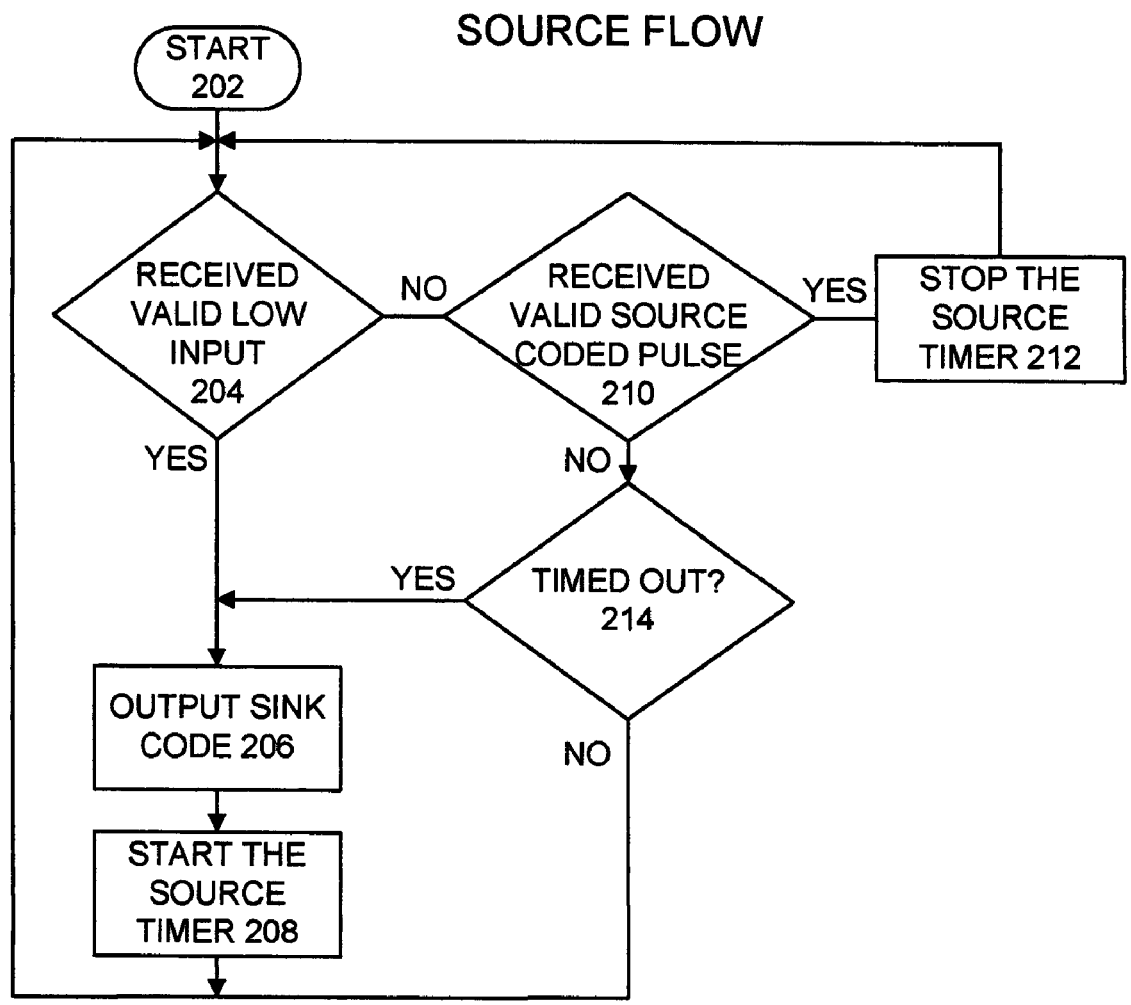
FIG. 2 is a flow chart illustrating source operational flow of the dual watchdog communication circuit of FIG. 1 in accordance with the preferred embodiment.

Referring now to FIG. 2, there are shown example steps illustrating operational flow of the source 102 of the dual watchdog communication circuit 100 in accordance with the preferred embodiment starting at a block 202. Checking for a received valid level output from the sink transceiver module 104, such as a valid low output, is performed as indicated at a decision block 204.

When the receiver 110 of the source transceiver module 102 receives a valid level output from the sink transceiver module 104, the source transceiver module 102 outputs a sink coded pulse to the sink transceiver module 104 as indicated at a block 206. The source transceiver module 102 starts a source timer 116 as indicated at a block 208.

Otherwise when the source transceiver module 102 does not receive a valid level output from the sink transceiver module 104, the source transceiver module 102 performs checking for a received valid source coded pulse from the sink transceiver module 104 as indicated at a decision block 210.

When a received valid source coded pulse from the sink transceiver module 104 is identified at decision block 210, then the source timer 116 is stopped as indicated at a block 212. Otherwise, checking for a time out of the source timer is performed as indicated at a decision block 214.

When a time out is not identified, then the operations return to decision block 204 to continue checking for a received valid level output from the sink transceiver module 104.

When a time out is identified at block 214, for example, when either forward noise or reverse noise is present on the line 106 that is large enough to interrupt the transfer either way, so that the source transceiver module 102 does not see the valid source coded pulse, then the source transceiver module 102 repeats outputting the sink coded pulse to the sink transceiver module, and starting the source timer at blocks 206 and 208, and continues until a valid source coded pulse is received.

Figure 3:
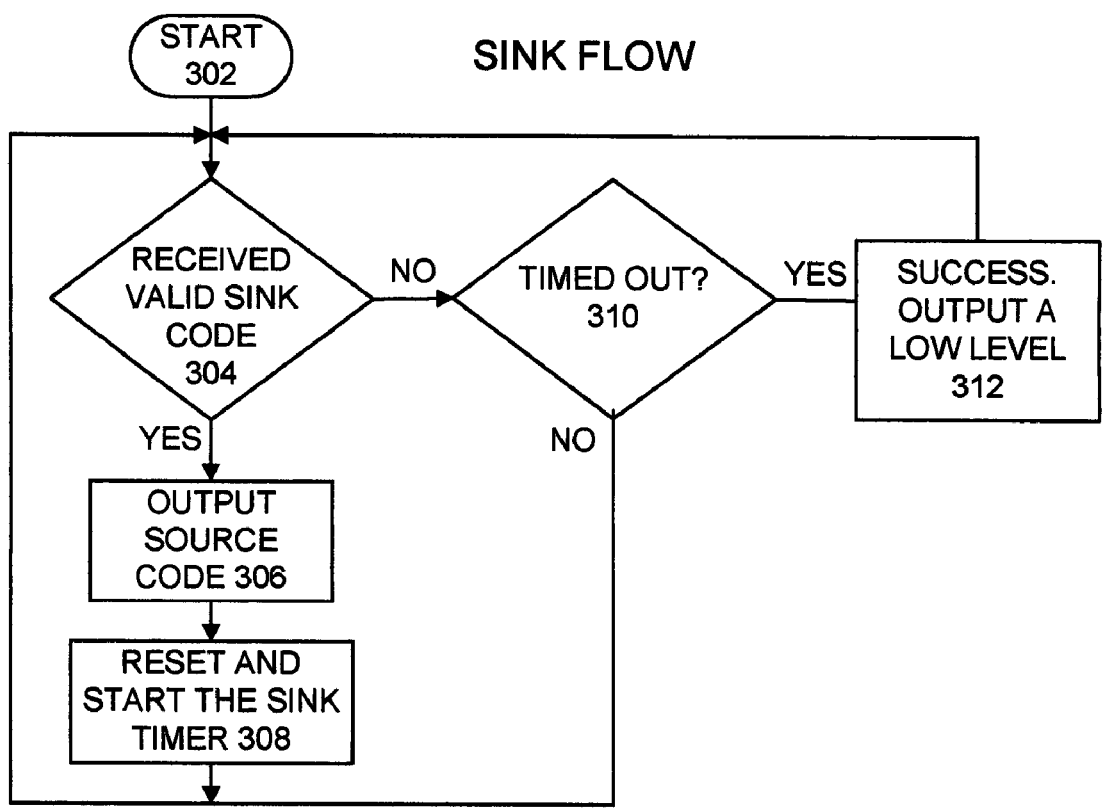
FIG. 3 is a flow chart illustrating sink operational flow of the dual watchdog communication circuit of FIG. 1 in accordance with the preferred embodiment.

Referring now to FIG. 3, there are shown example steps illustrating operational flow of the sink 104 of the dual watchdog communication circuit 100 in accordance with the preferred embodiment starting at a block 302. Checking for a received valid sink code or a sink coded pulse is performed as indicated at a decision block 304. Upon receiving the valid sink coded pulse, the sink transceiver module 104 outputs a source coded pulse to the source transceiver module 102 as indicated at a block 306. Then the sink transceiver module 104 resets and starts a sink timer as indicated at a block 308.

When a received valid sink code is not identified, then checking for a time out of the sink timer 126 is performed as indicated at a decision block 310. When the source transceiver module receives the valid source coded pulse, then the source transceiver module sends nothing further. When the sink timer times out as indicated at a decision block 310, the sink transceiver module 104 generates and outputs the valid low level output as indicated at a block 308

Figure 4:
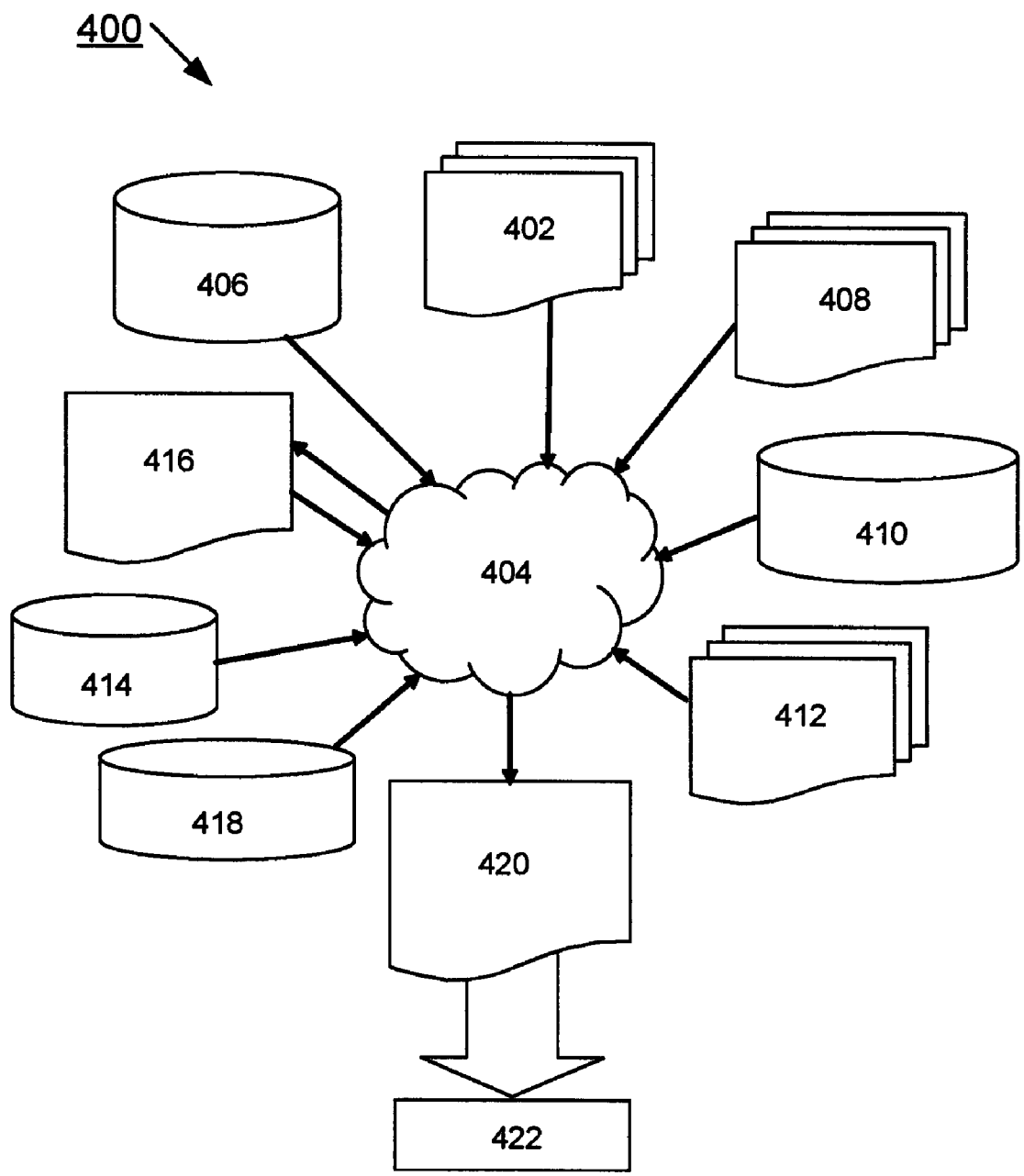
FIG. 4 is a flow diagram of a design process used in semiconductor design, manufacturing, and/or test.

FIG. 4 shows a block diagram of an example design flow 400. Design flow 400 may vary depending on the type of IC being designed. For example, a design flow 400 for building an application specific IC (ASIC) may differ from a design flow 400 for designing a standard component. Design structure 402 is preferably an input to a design process 404 and may come from an IP provider, a core developer, or other design company or may be generated by the operator of the design flow, or from other sources. Design structure 402 comprises circuit 100 in the form of schematics or HDL, a hardware-description language, for example, Verilog, VHDL, C, and the like. Design structure 402 may be contained on one or more machine readable medium. For example, design structure 402 may be a text file or a graphical representation of circuit 100. Design process 404 preferably synthesizes, or translates, circuit 100 into a netlist 406, where netlist 406 is, for example, a list of wires, transistors, logic gates, control circuits, I/O, models, etc. that describes the connections to other elements and circuits in an integrated circuit design and recorded on at least one of machine readable medium. This may be an iterative process in which netlist 406 is resynthesized one or more times depending on design specifications and parameters for the circuits.

Design process 404 may include using a variety of inputs; for example, inputs from library elements 408 which may house a set of commonly used elements, circuits, and devices, including models, layouts, and symbolic representations, for a given manufacturing technology, such as different technology nodes, 32 nm, 45 nm, 90 nm, and the like, design specifications 410, characterization data 412, verification data 414, design rules 416, and test data files 418, which may include test patterns and other testing information. Design process 404 may further include, for example, standard circuit design processes such as timing analysis, verification, design rule checking, place and route operations, and the like. One of ordinary skill in the art of integrated circuit design can appreciate the extent of possible electronic design automation tools and applications used in design process 404 without deviating from the scope and spirit of the invention. The design structure of the invention is not limited to any specific design flow.

Design process 404 preferably translates an embodiment of the invention as shown in FIG. 1 along with any additional integrated circuit design or data (if applicable), into a second design structure 420. Design structure 420 resides on a storage medium in a data format used for the exchange of layout data of integrated circuits, for example, information stored in a GDSII (GDS2), GL1, OASIS, or any other suitable format for storing such design structures. Design structure 420 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIG. 1. Design structure 420 may then proceed to a stage 422 where, for example, design structure 420 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A dual watchdog communication circuit for implementing single line asynchronous dual watchdog communication for electrostatic discharge (ESD) noise immunity comprising:
    a source transceiver module;
    a sink transceiver module; said sink transceiver module being connected by a single line to said source transceiver module; said single line carrying communications between the source transceiver module and the sink transceiver module;
    each of said source transceiver module and said sink transceiver module using a coded pulse to implement the single line asynchronous dual watchdog communication for providing ESD noise immunity; and
    said source transceiver module including a transmitter, a first receiver coupled to the single line; a timer, a second receiver receiving an input to the source transceiver module; and a control block coupled to said transmitter, said timer, and said second receiver; said control block for controlling operation of said source transceiver module.

2. A dual watchdog communication circuit for implementing single line asynchronous dual watchdog communication for electrostatic discharge (ESD) noise immunity comprising:
    a source transceiver module;
    a sink transceiver module; said sink transceiver module being connected by a single line to said source transceiver module; said single line carrying communications between the source transceiver module and the sink transceiver module;
    each of said source transceiver module and said sink transceiver module using a coded pulse to implement the single line asynchronous dual watchdog communication for providing ESD noise immunity; and
    said sink transceiver module including a transmitter, a receiver coupled to the single line, a timer, and a second transmitter providing an output from the sink transceiver module.

3. The dual watchdog communication circuit as recited in claim 2 wherein said sink transceiver module includes a control block coupled to said receiver, said timer and said second transmitter.

4. The dual watchdog communication circuit as recited in claim 2 wherein said source transceiver module responsive to receiving a valid level output from said sink transceiver module, said source transceiver module outputs a sink coded pulse to said sink transceiver module, and starts a source timer.

5. The dual watchdog communication circuit as recited in claim 4 wherein said sink transceiver module responsive to receiving said valid sink coded pulse, said sink transceiver module starts a sink timer and outputs a source coded pulse to said source transceiver module.

6. The dual watchdog communication circuit as recited in claim 5 wherein said source transceiver module responsive to receiving said valid source coded pulse, said source transceiver module stops sending to said sink transceiver module.

7. The dual watchdog communication circuit as recited in claim 6 wherein said sink transceiver module generates and outputs said valid level output to said source transceiver module responsive to a sink timer time out.

8. The dual watchdog communication circuit as recited in claim 4 wherein said source transceiver module responsive to a time out of said source timer without receiving valid source coded pulse, said source transceiver module outputs said sink coded pulse to said sink transceiver module, and starts said source timer, and continues until a valid source coded pulse is received.

9. The method for implementing single line asynchronous dual watchdog communication for electrostatic discharge (ESD) noise immunity comprising the steps of:
    providing a source transceiver module;
    providing a sink transceiver module;
    connecting said sink transceiver module by a single line to said source transceiver module; said single line carrying communications between the source transceiver module and the sink transceiver module; and
    using a coded pulse with each of said source transceiver module and said sink transceiver module to implement the single line asynchronous dual watchdog communication for providing ESD noise immunity; and
    said source transceiver module responsive to receiving a valid level output from said sink transceiver module, outputs a sink coded pulse to said sink transceiver module, and starts a source timer.

10. The method for implementing single line asynchronous dual watchdog communication for electrostatic discharge (ESD) noise immunity as recited in claim 9 wherein said sink transceiver module responsive to receiving said valid sink coded pulse, starts a sink timer and outputs a source coded pulse to said source transceiver module.

11. The method for implementing single line asynchronous dual watchdog communication for electrostatic discharge (ESD) noise immunity as recited in claim 10 wherein said source transceiver module responsive to receiving said valid source coded pulse, said source transceiver module stops sending to said sink transceiver module, and wherein said sink transceiver module generates and outputs said valid level output to said source transceiver module responsive to a sink timer time out.

12. The method for implementing single line asynchronous dual watchdog communication for electrostatic discharge (ESD) noise immunity as recited in claim 10 wherein said source transceiver module responsive to a time out of said source timer without receiving valid source coded pulse, said source transceiver module outputs said sink coded pulse to said sink transceiver module, and starts said source timer, and continues until a valid source coded pulse is received.

13. A design structure tangibly embodied in a non-transitory machine readable medium used in a design process, the design structure comprising:
    a dual watchdog communication circuit tangibly embodied in the non-transitory machine readable medium used in the design process, said dual watchdog communication circuit for implementing single line asynchronous dual watchdog communication for electrostatic discharge (ESD) noise immunity; said dual watchdog communication circuit includes a source transceiver module;

a sink transceiver module; said sink transceiver module being connected by a single line to said source transceiver module; said single line carrying communications between the source transceiver module and the sink transceiver module; and each of said source transceiver module and said sink transceiver module using a coded pulse to implement the single line asynchronous dual watchdog communication for providing ESD noise immunity;

said source transceiver module including a transmitter, a first receiver coupled to the single line; a timer, a second receiver receiving an input to the source transceiver module; and a control block coupled to said transmitter, said timer, and said second receiver; said control block for controlling operation of said source transceiver module; wherein the design structure, when read and used in the manufacture of semiconductor chips produces a pair of semiconductor chips comprising said dual watchdog communication circuit.

14. The design structure of claim 13, wherein the design structure comprises a netlist, which describes said dual watchdog communication circuit.

15. The design structure of claim 13, wherein the design structure includes at least one of test data files, characterization data, verification data, or design specifications.

* * * * *